(12) United States Patent
Andres et al.

(10) Patent No.: US 8,181,725 B2
(45) Date of Patent: May 22, 2012

(54) AIRCRAFT TUG

(75) Inventors: Michael J. Andres, Roscoe, IL (US);
Shin Katsumata, Rockford, IL (US)

(73) Assignee: Hamilton Sundstrand Corporation,
Windsor Locks, CT (US)

( * ) Notice: Subject to any disclaimer, the term of this patent is extended or adjusted under 35 U.S.C. 154(b) by 121 days.

(21) Appl. No.: 12/569,881

(22) Filed: Sep. 29, 2009

(65) Prior Publication Data

US 2011/0073388 A1    Mar. 31, 2011

(51) Int. Cl.
*B60T 7/16* (2006.01)

(52) U.S. Cl. ........ 180/14.7; 180/904; 180/11; 180/14.1; 180/14.4; 280/508; 280/477

(58) Field of Classification Search ............. 180/11, 180/904, 14.1, 14.4, 14.7; 280/508, 477
See application file for complete search history.

(56) References Cited

U.S. PATENT DOCUMENTS

| | | | |
|---|---|---|---|
| 2,751,990 A * | 6/1956 | Pearson et al. ............. | 180/6.2 |
| 4,007,890 A * | 2/1977 | Bremer et al. ............. | 244/50 |
| 4,113,041 A * | 9/1978 | Birkeholm ............. | 180/14.1 |
| 4,450,925 A | 5/1984 | Gardner | |
| 4,470,564 A | 9/1984 | Johnson | |
| 4,596,300 A | 6/1986 | Mankey | |
| 4,883,280 A | 11/1989 | Christian | |
| 4,950,121 A | 8/1990 | Meyer et al. | |
| 4,991,862 A * | 2/1991 | Tsao et al. ............. | 280/421 |
| 5,082,082 A | 1/1992 | Hvolka | |
| 5,151,003 A | 9/1992 | Zschoche | |
| 5,261,778 A | 11/1993 | Zschoche | |
| 5,302,075 A | 4/1994 | Zschoche | |
| 5,338,047 A | 8/1994 | Knisley | |
| 5,465,923 A | 11/1995 | Milner | |
| 5,480,274 A | 1/1996 | Franken et al. | |
| 5,549,436 A * | 8/1996 | Fresia ............. | 414/426 |
| 6,283,696 B1 | 9/2001 | Trummer et al. | |
| 6,305,484 B1 | 10/2001 | Leblanc | |
| 6,450,756 B1 | 9/2002 | Stahancyk et al. | |
| 6,543,790 B2 | 4/2003 | Johnson | |
| 6,600,992 B2 | 7/2003 | Dow | |
| 6,619,671 B1 | 9/2003 | Fine | |
| 6,739,822 B2 | 5/2004 | Johansson | |
| 6,894,625 B1 | 5/2005 | Kozma et al. | |
| 6,896,283 B1 | 5/2005 | Williams, Jr. | |
| 6,923,281 B2 | 8/2005 | Chernoff et al. | |
| 6,945,354 B2 | 9/2005 | Goff | |
| 7,344,109 B1 | 3/2008 | Rezai | |
| 7,506,707 B2 * | 3/2009 | Trujillo et al. ............. | 180/19.1 |

* cited by examiner

*Primary Examiner* — Anne Marie Boehler
*Assistant Examiner* — Michael Stabley
(74) *Attorney, Agent, or Firm* — Carlson Gaskey & Olds P.C.

(57) ABSTRACT

An aircraft tug includes a tow bar which extends from a chassis, the tow bar operable to autonomously attach with an aircraft main landing gear assembly and transfer electrical power therebetween.

5 Claims, 6 Drawing Sheets

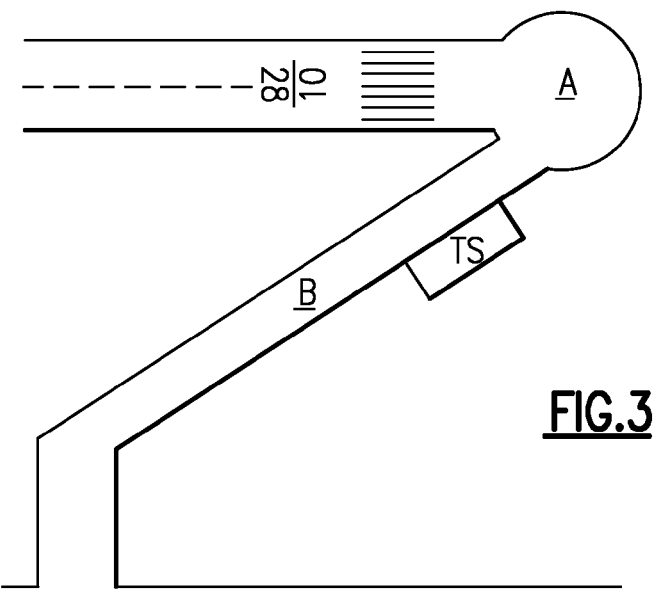
FIG.3
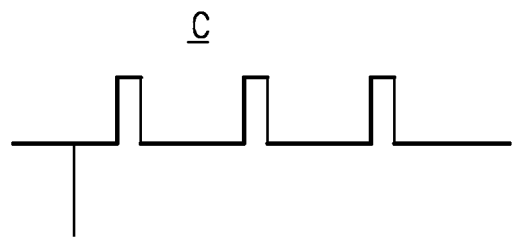
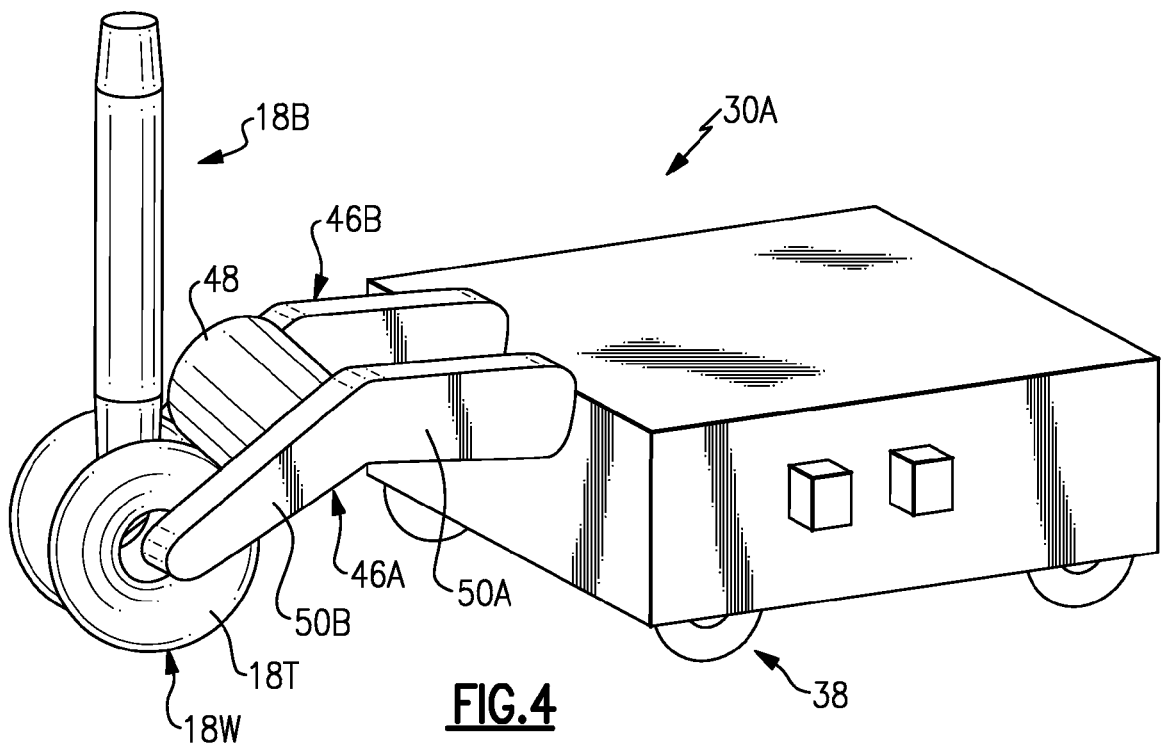
FIG.4

AIRCRAFT TUG

BACKGROUND

The present disclosure relates to ground movement of aircraft, and more particularly to an aircraft tug which moves an aircraft to a desired location without use of aircraft engine power.

Aircraft engine power is almost exclusively used to taxi aircraft, typically to or from a runway. Operation of the aircraft engines in a ground environment may be relatively loud and, when used to provide aircraft ground movement, may burn relatively large quantities of fuel.

Vehicles often referred to as a tug are typically utilized to facilitate the ground movement of aircraft. The tug is a small manned vehicle which couples to the aircraft nose gear such that the vehicle may push or tow the aircraft. The tug commonly utilizes a separate tow bar system for attachment to the aircraft nose gear. The most typical use for aircraft tugs is pushback from the terminal gate and to tow an aircraft for maintenance operations.

SUMMARY

An aircraft tug according to an exemplary aspect of the present disclosure includes a tow bar which extends from a chassis, the tow bar operable to autonomously selectively attach with an aircraft main landing gear assembly.

A method of taxiing an aircraft according to an exemplary aspect of the present disclosure includes: autonomously selectively attaching a multiple of aircraft tugs to a respective multiple of aircraft main landing gear assemblies; and remotely controlling the multiple of aircraft tugs to taxi the aircraft.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 3 is indicative of an airport layout and designated area for autonomous aircraft tug operations;

FIG. 4 is a perspective view of the aircraft tug of FIG. 2;

DETAILED DESCRIPTION

Figure 1:
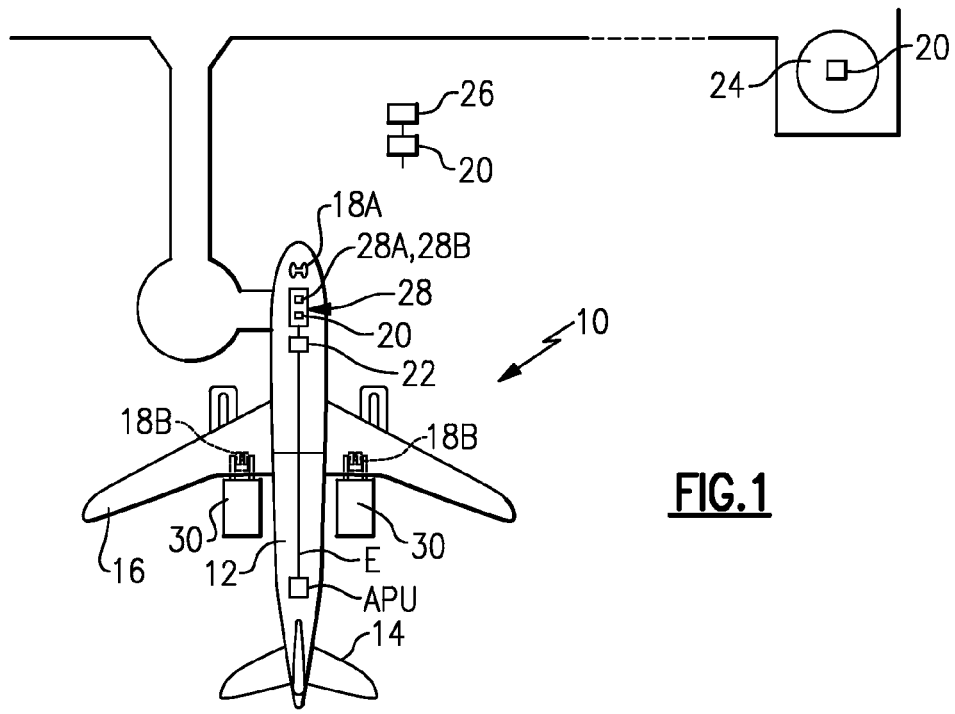
FIG. 1 is indicative of a aircraft within a typical airport layout by which an aircraft tug may provide the motive force to taxi the aircraft.

FIG. 1 schematically illustrates a general arrangement for remote controlled aircraft movement. The aircraft 10 generally includes a fuselage 12 with a tail 14 and a set a wings 16. The aircraft also includes a landing gear system 18 which generally includes a nose gear assembly 18A, and main gear assemblies 18B. Although a pair of main gear assemblies 18B is illustrated in the disclosed non-limiting embodiment, it should be understood that aircraft with any number of main gear assemblies 18B may benefit herefrom.

A remotely operated aircraft tug 30A is coupled to each main gear assembly 18B in a push arrangement. That is, the remotely operated aircraft tug 30A may attach aft of the main gear 18B to essentially push the aircraft 10 and provide the motive force therefore when not under aircraft engine power. Alternatively, the remotely operated aircraft tug 30A may attach forward of the main gear 18B to essentially pull the aircraft 10 and provide the motive force therefore when not under aircraft engine power.

Figure 2:
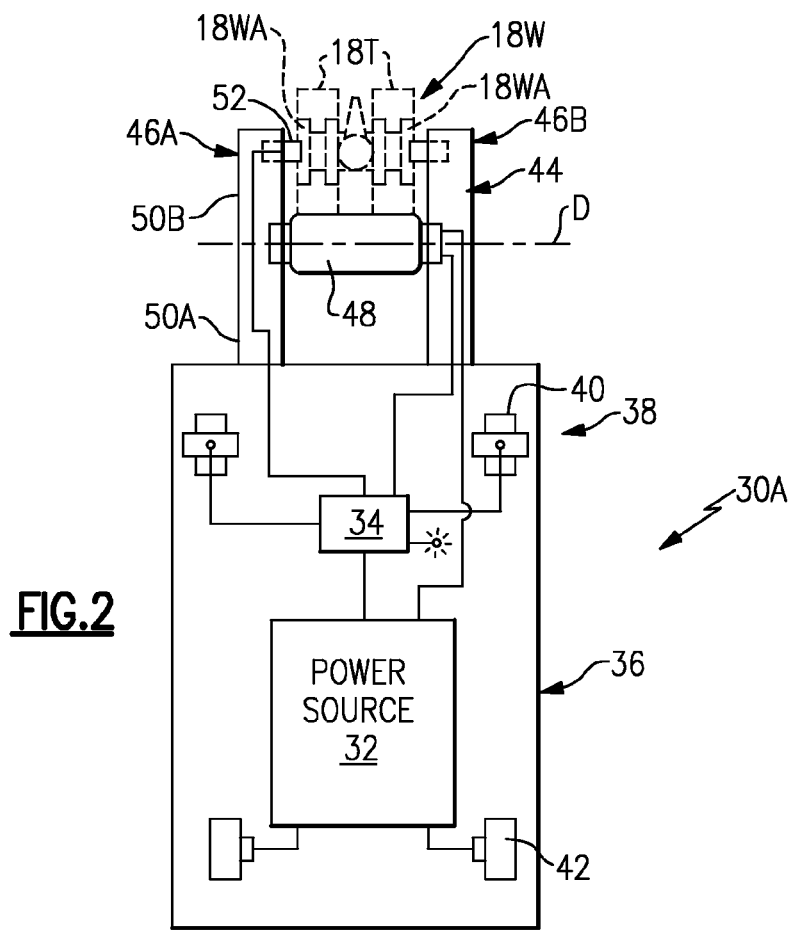
FIG. 2 is a schematic view of an aircraft tug.

The aircraft tug 30A generally includes a power source 32 and a control module 34 (FIG. 2). The power source 32 may include an on-board source such as an internal combustion engine or battery system. The power source 32 may be recharged while docked at the airport gate or between aircraft service events at a docking station within a designated aircraft tug staging area TS (FIG. 3) near an active runway. Alternatively or in addition thereto, the power source 32 may receive power from an off-board source such as an aircraft electrical system E typically generated by an aircraft auxiliary power unit (APU).

The control module 34 generally includes a processor, a memory, and an interface. The processor may be any type of known microprocessor having desired performance characteristics. The memory may be any computer readable medium which stores the data and control algorithms described herein. The interface facilitates communication with other tug systems such as a wireless communication system. The functions of the control module 34 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment.

The control module 34 provides for operation of the aircraft tug 30A through wireless communication with a remote control source 20. The remote control source 20 may be integrated into the aircraft 10 for use by an aircrew 22, integrated into a fixed airport installation 24 for automated taxi operations, or may be a hand held system for use by a ground crew 26. The aircraft 10 may be steered by the aircrew 22 through the aircraft flight controls 28, autonomously through the fixed airport installation 24, by the off-board ground crew 26 or combinations thereof. For example, the aircraft tugs 30A may be autonomously positioned for attachment to each main gear assembly 18B within a taxiway area A, controlled by the aircrew 22 within a designated area B, then positioned within an embark/disembark area C by the groundcrew 26 (FIG. 3). It should be understood that various methodologies for control and operations may alternatively or additionally be provided.

The aircraft flight controls 28, such as rudder pedal system 28A or nose gear steering tiller 28B, steers the nose gear 18A to control the direction of the aircraft 10 with the motive force provided by the aircraft tugs 30A. In this example, the remote control source 20 need only provide speed control for each aircraft tug 30A as steering control is achieved directly through the steerable nose gear 18A under conventional flight controls 28 such as the rudder pedal system 28A or nose gear steering tiller 28B. Since an individual aircraft tug 30A attaches to each of the main gear 18B, differential traction therebetween may also be utilized to maneuver the aircraft 30A. Moreover, each aircraft tug 30A may move independently such that a differential speed of each individual aircraft tug 30A provides additional aircraft maneuverability than that heretofore achieved. For example, one aircraft tug 30A may push forward while the other aircraft tug 30A remains stationary or pulls backward so that the aircraft 10 may be essentially pivoted in place.

Movement of the aircraft tugs 30A may be controlled directly through the aircraft flight controls 28 such as the rudder pedal system 28A and the throttle quadrant 28B which communicate through the remote control source 20. Since multi-engine aircraft include a multiple of throttles, operation of particular throttles, for example, the throttle associated with the port engine may be operable to control the aircraft tug 30A connected to the port main gear assembly 18B while the throttle associated with the starboard engine may be operable to control the aircraft tug 30A connected to the starboard main gear assembly 18B. Such an arrangement facilitates intuitive aircrew control similar to that utilized when the aircraft is taxied under engine power.

Alternatively or in addition thereto, the remote control source 20 provides aircraft tug control independent of the aircraft flight controls 28. The remote control source 20, in one non-limiting embodiment, may be a control panel within the cockpit.

Referring to FIG. 2, the aircraft tug 30A generally includes the power source 32 and the control module 34 within a chassis 36 which rides upon an undercarriage 38. The chassis 36 may be a relatively low slung arrangement to readily fit underneath the aircraft 10. It should be understood that various shapes of chassis may alternatively be provided. The undercarriage 38 may include at least one set of steerable wheels 40 and one set of driven wheels 42 powered by the power source 32.

A tow bar 44 extends from the chassis 36 to engage the respective main gear assemblies 18B. The tow bar 44 includes a first arm 46A and a second arm 46B with a drive drum 48 therebetween. The first arm 46A and the second arm 46B may be spaced a fixed distance apart to receive the main gear wheels 18W therebetween. Alternatively, the first arm 46A is movable relative to the second arm 46B such that the tow bar 44 is engageable with various gear systems 18.

The first arm 46A and the second arm 46B in the disclosed non-limiting embodiment each include a first arm section 50A and a second arm section 50B, the second arm section 50B angled relative to the first arm section 50A at an obtuse angle (FIG. 4). The first arm section 50A may be generally parallel to ground with the second arm section 50B angled toward the ground. The second arm section 50B on either or both the first arm 46A and the second arm 46B includes an engagement system 52 operable to engage the main gear assembly 18B. The engagement system 52 selectively engages and disengages with the respective main gear assembly 18B generally around the landing gear tires 18T. The engagement system 52 may selectively engage and disengage with a hollowed end section of an axle 18WA or other portion of the main gear assembly 18B. The engagement system 52 may be of various forms, such as a link, connector, clevis or other attachment. Such an arrangement may be advantageous for main gear assemblies with single or double wheels typical of relatively smaller aircraft.

The drive drum 48 is powered by the power source 32 to rotate about an axis of rotation D. When the engagement system 52 is engaged with the main gear assembly 18B, the drive drum 48 is operable to transfer rotation to the main gear tires 18T of the main gear wheels 18W and thereby move the aircraft 10. The drive drum 48 may include a resilient material such as rubber or a machined surface such as serrations or knurling so as to provide significant traction to the main gear tires 18T without damage thereto.

Whereas the tow bar 44 is attached to the main gear assembly 18B, the motive force may alternatively or additionally be communicated directly through the drive drum 48. The steerable wheels 40 and the driven wheels 42 permit controlled independent movement of the aircraft tug 30A when not attached to the main gear assemblies 18B. When attached to the main gear assembly 18B, the drive drum 48 may alternatively or additionally be rotated to rotate the main gear tires 18T and thus move the aircraft 10. The extended tow bar 44 and chassis 36 readily operate as a counterbalance for power transfer to the drive drum 48.

Figure 5:
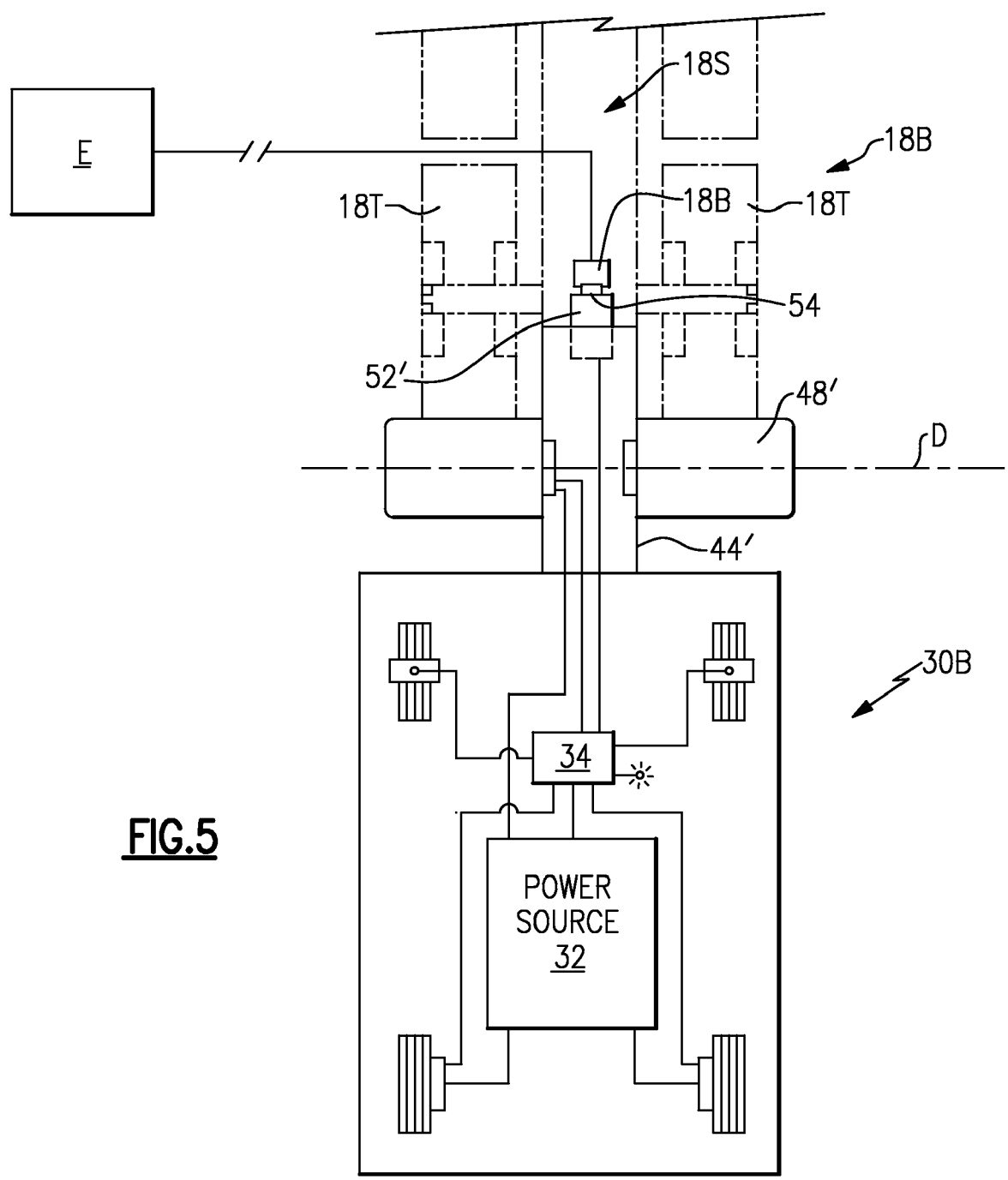
FIG. 5 is a schematic view of another embodiment of an aircraft tug.
Figure 6:
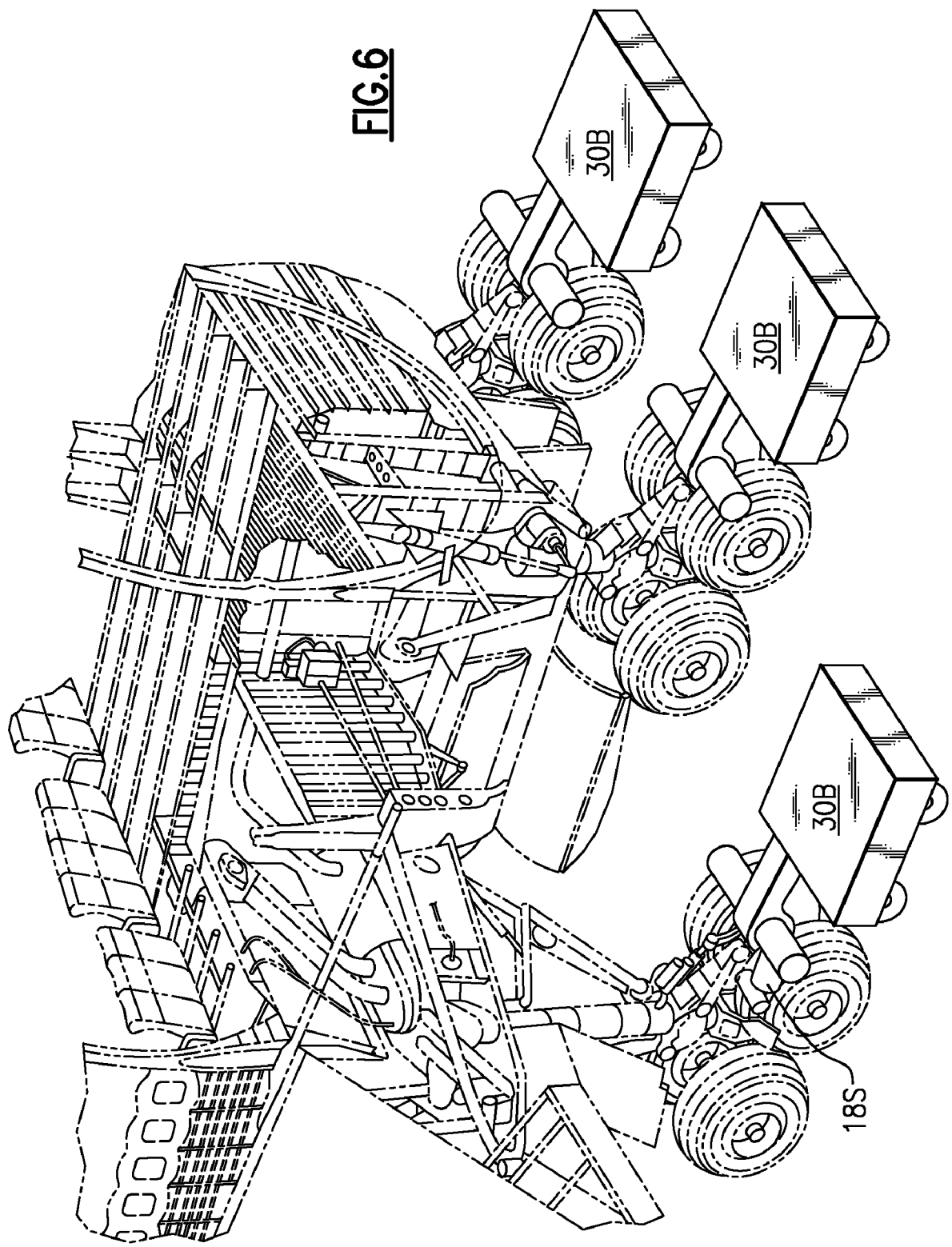
FIG. 6 is a perspective view of the aircraft tug of FIG. 5.

Referring to FIG. 5, an alternative non-limiting embodiment the aircraft tug 30 includes a tow bar 44' with a drive drum 48' which extends from at least one side. In this non-limiting embodiment, the tow bar 44' include an engagement system 52' operable to engage the respective main gear assembly 18B. The engagement system 52' selectively engages and disengages with the main gear assembly 18B generally between the landing gear tires 18T (also illustrated in FIG. 6). The engagement system 52' may selectively engage and disengage with a landing gear component 18S such as a strut, bogie beam or other portion of the main gear assembly 18B. Such an arrangement may be advantageous for main gear assemblies with a multiple of wheels typical of larger aircraft.

The aircraft tug 30 may additionally provide all or some aircraft ground electric power for a more electric aircraft while attached to the aircraft tug 30. A tug power connector 54 on the tow bar 44' may be utilized to connect the power source 32 with the aircraft electrical system E. An aircraft ground electric power connection 18E may be located on the main gear assembly 18B in a position accessible by the tug power connector 54 such that power is communicated between the aircraft tug 30 and the aircraft electrical system E when engagement with the main gear assembly 18B is established. The tug power connector 54, in one non-limiting embodiment, may be integrated with the engagement system 52'

Power for ground operation of aircraft environmental control system, lighting, hydraulic electric motor pumps, communication, navigation, lavatory operation, engine start and other requirements may thus be provided by the aircraft tug 30. The aircraft APU thus need not be operated at airports where such aircraft tugs 30 are provided—typically the busiest and thus the highest emission airports. Minimal additional aircraft weight is required for the aircraft ground electric power connection 18E. Maintenance of the aircraft tug and ground power system is on a per aircraft tug basis and will thereby not impact aircraft availability.

Figure 7:
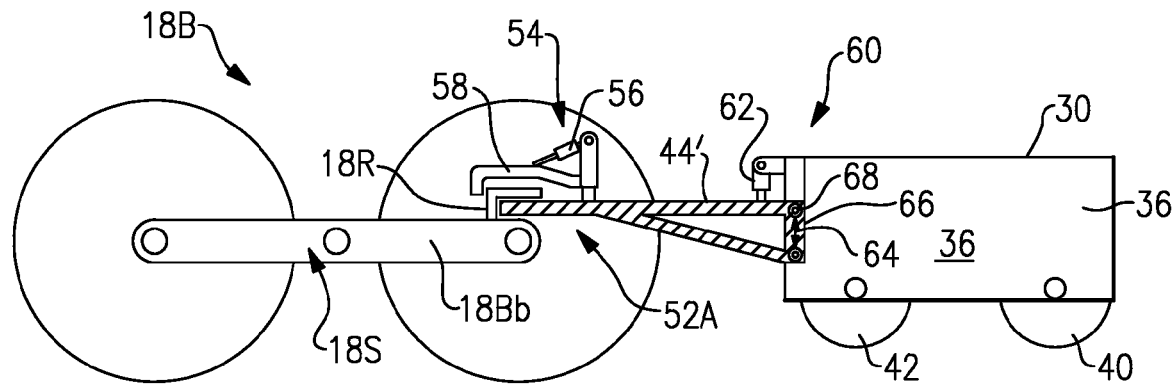
FIG. 7 is a schematic view of one embodiment of an engagement system for the aircraft tug.

Referring to FIG. 7, one non-limiting embodiment of the engagement system 52A is operable to engage the landing gear component 18S of the respective main gear assembly 18B through a receiver 18R on the main landing gear bogie beam 18Bb. The engagement system 52A may be used with or without the drive drum 48.

The engagement system 52A extends from the tow bar 44' for insertion at least partially into the receiver 18R as the aircraft tug 30 tug approaches the main gear assembly 18B. In addition, a latch system 54 includes a latch actuator 56 and a receiver latch 58. The latch actuator 56, such as a pneumatic, hydraulic, electric or mechanical actuator drives the receiver latch 58 at least partially around the receiver 18R. The receiver latch 58 may at least partially surround the receiver 18R opposite the area within which the engagement system 52A extends into the receiver 18R to provide for fore and aft force transfer from the aircraft tug 30 to the main gear assembly 18B.

After the tow bar 44' is latched to the main gear assembly 18B, a weight transfer system 60 is actuated to raise the tow bar 44' relative to the chassis 36. A weight transfer actuator 62 actuator such as a pneumatic, hydraulic, electric or mechanical actuator drives displaces the tow bar 44' on the chassis 36 with respect to the undercarriage 38 along a vertical guide system 64 such as a roller system which may include a vertical guide 66 on the chassis 36 an a roller system 68 on the tow bar 44' which engages the vertical guide. The weight transfer actuator 62 effectively transfers a vertical load from the main gear assembly 18B to the aircraft tug 30 to increase traction on the undercarriage 38 to reduce the deadweight requirements for the aircraft tug 30 yet provide sufficient normal force for traction. Should slip be detected, the vertical force from the weight transfer system 60 may be adjusted to maintain a desired balance.

The weight transfer system 60 may be further adjusted so that the aircraft tug 30 rotates about the axle closest to the main gear assembly 18B after engagement to increase force on the driven wheels 42 and lift the far, steerable wheels 40 to reduce a yaw force from potential transfer to the main gear assembly 18B. When disengaged from the main gear assembly 18B, the aircraft tug 30 rests on both sets of wheels 40, 42.

Figure 8:
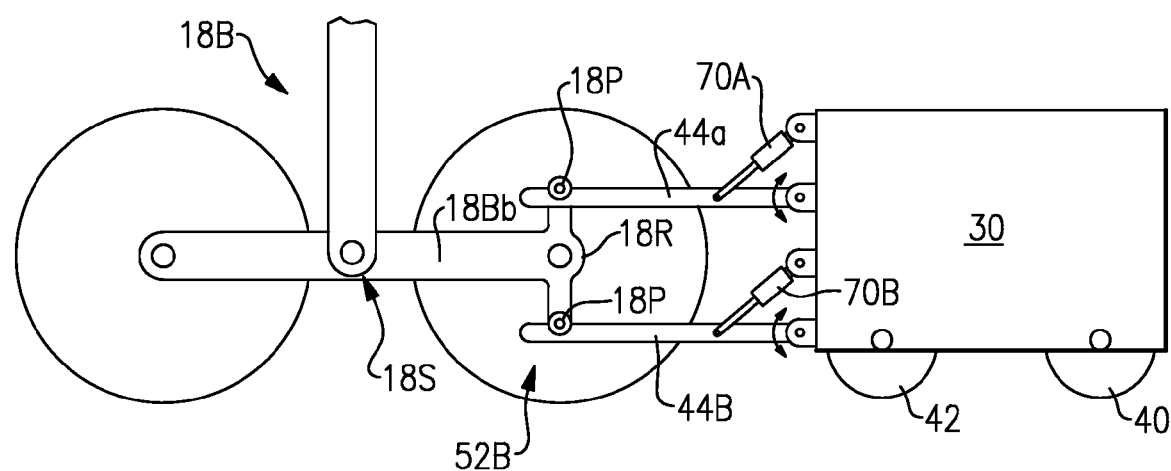
FIG. 8 is a schematic view of another embodiment of an engagement system for the aircraft tug.

Referring to FIG. 8, another non-limiting embodiment of an engagement system 52B is operable to engage the landing gear component 18S of the respective main gear assembly 18B through a receiver 18R on the main landing gear bogie beam 18Bb. The engagement system 52B may be used with or without the drive drum 48.

The receiver 18R in this non-limiting embodiment includes a set of pins 18P which are displaced vertically relative to the main landing gear bogie beam 18Bb. The tow bar 44 includes a first tow bar section 44A and a second tow bar section 44B.

The first tow bar section 44A and the second tow bar section 44B are respectively actuated by a respective actuator 70A, 70B such as a pneumatic, hydraulic, electric or mechanical actuator in an upward direction to engage the pins 18P from below relative to ground to thereby provide for fore and aft force transfer from the aircraft tug 30 to the main gear assembly 18B. The engagement arrangement provided by the first tow bar section 44A and the second tow bar section 44B integrates the weight transfer discussed above to effectively transfer a vertical load from the main gear assembly 18B to the aircraft tug 30 to increase traction on the undercarriage 38 to reduce the deadweight requirements for the aircraft tug 30 yet provide sufficient normal force for traction. The first tow bar section 44A and the second tow bar section 44B also permits independent adjustment as discussed above so that the aircraft tug 30 rotates about the axle closest to the main gear assembly 18B after engagement to increase force on the driven wheels 42 and lift the far, steerable wheels 40 and to reduce a yaw force from potential transfer to the main gear assembly 18B.

Figure 9:
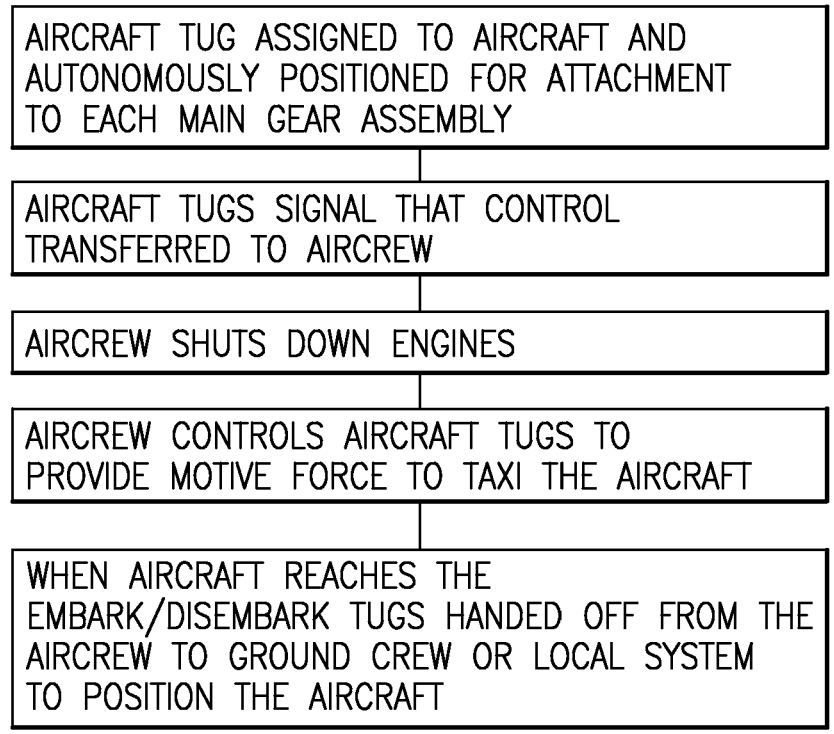
FIG. 9 is a flow chart which represents aircraft tug operation for an aircraft arrival.

Referring to FIG. 9, when the aircraft 10 lands and reaches the taxiway area A, the aircraft tugs 30A assigned by the fixed airport installation 24 or other system are autonomously positioned and attach to each main gear assembly 18B. The aircraft tugs then signal that control is transferred to the aircrew 22 to provide the motive force to move the aircraft 10 within the designated area B. The aircrew may then shut down the aircraft engines. When the aircraft 10 reaches an embark/disembark area C, the aircraft 10 may be finally positioned by the groundcrew 26, the aircrew 22, or autonomously through the fixed airport installation 24. That is, control of the aircraft tugs may be handed off from the aircrew 22 to the ground crew 26 or another local system to autonomously position the aircraft 10.

Figure 10:
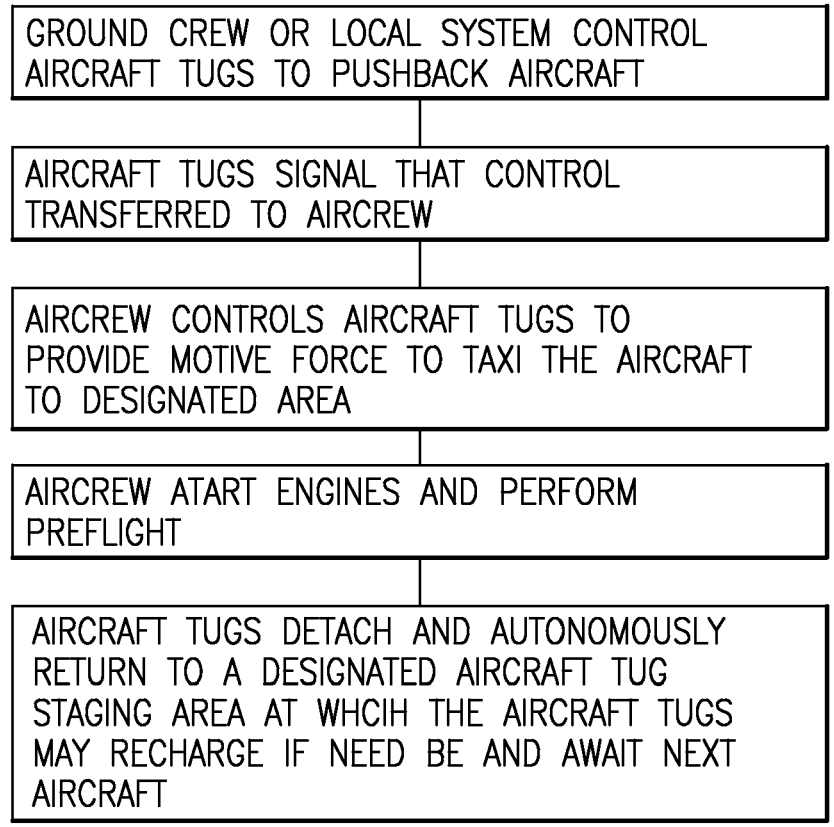
FIG. 10 is a flow chart which represents aircraft tug operation for an aircraft departure.

Referring to FIG. 10, from the embark/disembark area C, the procedure is essentially reversed so that once pushback occurs, control of the aircraft tugs may be handed off from the ground crew 26 or the local system to the aircrew 22 to permit the aircrew 22 to taxi out to the designated departure runway. When the aircrew 22 reaches a desired location off the departure runway such as the taxiway area A, the aircrew 22 may start engines and perform a preflight check. Once complete, the aircrew 22 will then signal for the aircraft tugs to detach. The aircraft tugs may then autonomously return to the designated aircraft tug staging area TS (FIG. 3) at which the aircraft tug may recharge if need be. It should be understood that various methodologies for control and operations may alternatively or additionally be provided to include for example, that the tug 30 is driven manually under some circumstances.

As it may not be appropriate for the aircraft tugs to be placed on an active runway; and aircraft typically require a warm-up and preflight check period, the taxiway area A may be remote from the active runway which still requires aircraft to taxi under their own power. However, such operations as those described herein significantly reduces aircraft idle and taxi time when under their own power.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An aircraft tug comprising:
 a chassis;
 a tow bar which extends from said chassis, said tow bar includes a first arm and a second arm operable to autonomously selectively attach with an aircraft main landing gear assembly, said tow bar includes an engagement system operable to engage the aircraft main gear assembly such that said first arm is located adjacent to one side of said at least one landing gear tire and said second arm is located adjacent to the other side of said at least one landing gear tire;
 a drive drum which selectively rotates about an axis of rotation between said first arm and said second arm to selectively drive the at least one landing gear tire; and
 a tug power connector mounted to said engagement system operable to autonomously connect with an aircraft ground electric power connection located on the aircraft main landing gear assembly to transfer electrical power therebetween.

2. The aircraft tug as recited in claim 1, further comprising an undercarriage upon which said chassis is supported, said undercarriage includes at least one set of steerable wheels and one set of driven wheels.

3. An aircraft tug comprising:

a chassis;

a tow bar which extends from said chassis, said tow bar operable to autonomously selectively attach from aft of an aircraft main landing gear assembly through an engagement system; and a tug power connector mounted to said tow bar operable to autonomously attach aft of said aircraft main landing gear assembly through an engagement system to connect with an aircraft ground electric power connection located on the aircraft main landing gear assembly to transfer electrical power therebetween.

4. The aircraft tug as recited in claim 3, wherein said tug power connector is mounted to said engagement system.

5. The aircraft tug as recited in claim 3, further comprising an undercarriage upon which said chassis is supported, said undercarriage includes at least one set of steerable wheels and one set of driven wheels.

* * * * *